May 9, 1933.  A. G. HEGGEM  1,908,421
PIPE GRIPPING DEVICE
Filed Dec. 10, 1931  2 Sheets-Sheet 1
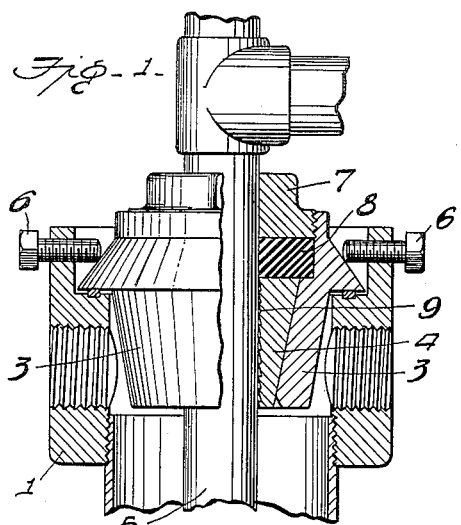
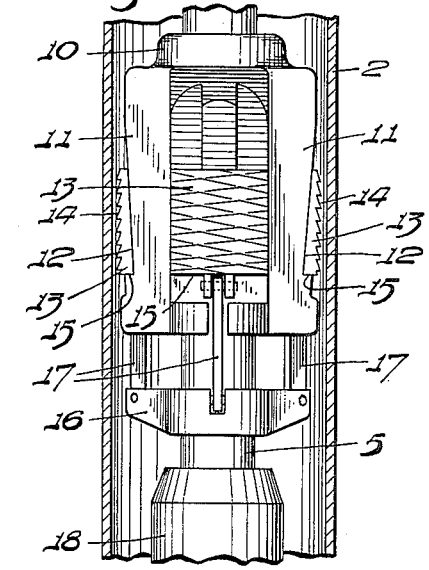
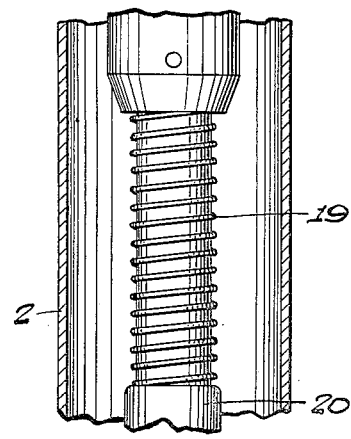
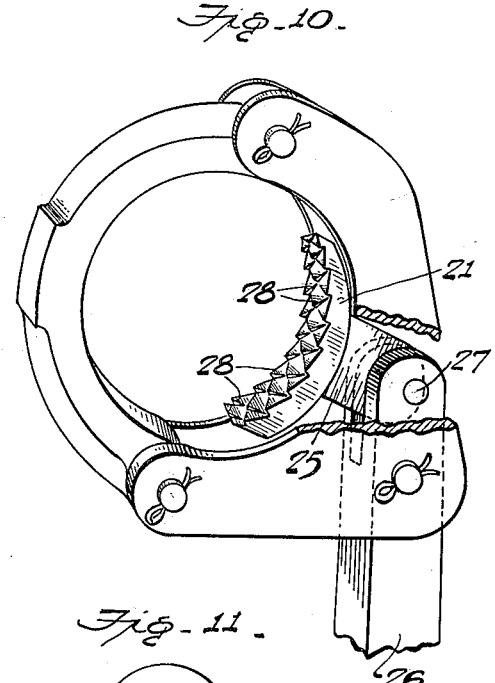
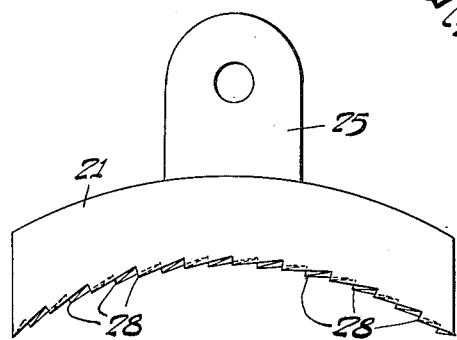
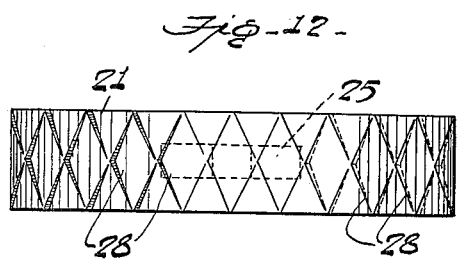
INVENTOR
Alfred G. Heggem
BY
his ATTORNEYS

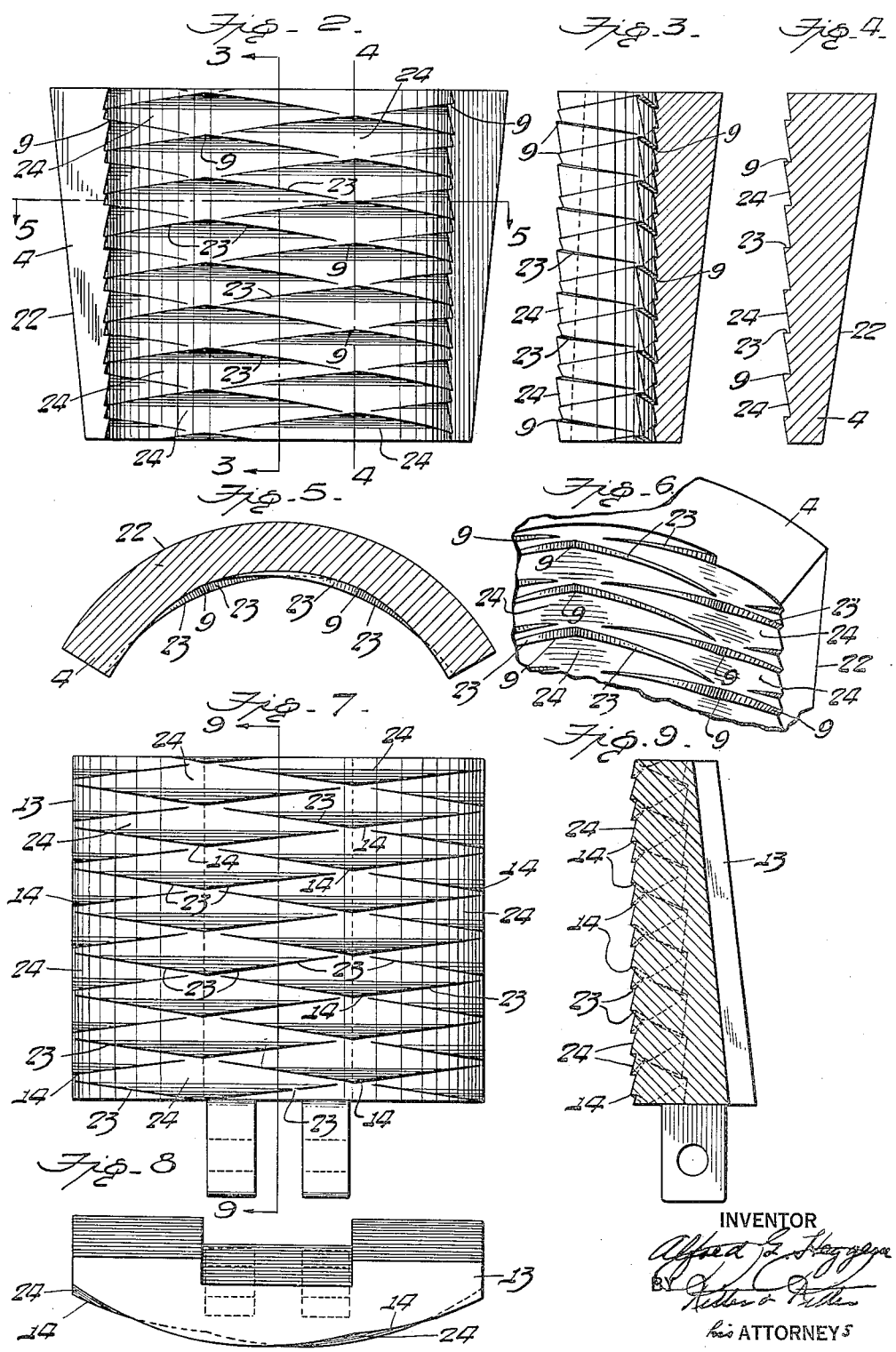

Patented May 9, 1933

1,908,421

UNITED STATES PATENT OFFICE

ALFRED G. HEGGEM, OF TULSA, OKLAHOMA

PIPE GRIPPING DEVICE

Application filed December 10, 1931. Serial No. 580,206.

My invention relates to pipe gripping devices which are especially well suited to serve the purpose of slips of the character employed in casing bowls, slip sockets, spiders, tubing catchers, casing spears, casing packers, tubing hangers and other well-known oil well appliances embodying slips formed with wickers for gripping or biting into pipe or other cylindrical parts.

The primary object of the invention is to provide a pipe gripping device, shoe or slip having wickers which are of a form enabling them to quickly acquire an efficient hold upon a pipe with minimum weakening of the latter.

A further object of the invention is to provide wickers which may be readily manufactured and which include a plurality of sharp points formed by intersecting obliquely extending abutments which are of progressively decreasing depth as they diverge from said points.

As is well-known, many appliances, such as tubing catchers, casing spears, tubing hangers and the like, which are used in the drilling and operation of oil wells, employ tapered slips as a means for tightly gripping the tubing or casing of the well or other cylindrical surface. These slips are customarily formed with wickers which conform to the curvature of the pipe they are to engage, that is to say, the wickers are formed by a series of parallel grooves of uniform depth which are so related as to form sharp edged shoulders opposed to the pipe. In use this form of slip does not take hold of the pipe with the desirable promptness but allows the pipe to slip somewhat uncertainly before the wickers are forced below the surface of the pipe. Moreover, the customary form of wicker, being of uniform depth and forming a continuous or substantially continuous sharp edge conforming to the curvature of the pipe, acts to reduce the cross-sectional area of the pipe along a line encircling the pipe and corresponding to the direction of the wicker, thus reducing the strength of the pipe. By my invention a form of wicker is provided having a sharp point for engaging the pipe immediately and having angular abutments or buttress faces which diverge from the sharp point so as to cut diagonally into the surface of the pipe with a sliding stroke, thus permitting the wickers to act promptly and to secure a firm hold on the pipe without weakening the latter by cutting continuously into its entire circumference.

The principal feature of the invention consists in forming the pipe gripping device as a segmental member having a surface of generally cylindrical form which is provided with a plurality of sharp points spaced from each other and formed by obliquely extending intersecting buttress faces, abutments or shoulders which decrease in depth as they diverge from their points of intersection.

A further feature of the invention consists in arranging the said points and diverging abutments or buttress faces on spiral lines having opposite pitches.

Other features of the invention residing in advantageous details of construction will hereinafter appear and be pointed out in the claims.

In the drawings illustrating the invention, the scope whereof is pointed out in the claims,—

Figure 1 is a view partly in elevation and partly in section showing typical forms of tubing hangers and tubing catchers employing pipe gripping devices embodying the invention;

Figure 2 is a detail elevational view of a pipe gripping device employed as a slip in the tubing hanger illustrated in Figure 1;

Figure 3 is a sectional view on the line 3—3, Figure 2, looking in the direction of the arrows;

Figure 4 is a sectional view on the line 4—4, Figure 2;

Figure 5 is a sectional view on the line 5—5, Figure 2;

Figure 6 is a detail perspective view of the construction shown in Figures 2 to 5 inclusive;

Figure 7 is a detail elevational view of one of the slips employed in the tubing catcher illustrated in Figure 1, the wickers being formed upon the outer side of the slips;

Figure 8 is a plan view of the slip shown in Figure 7;

Figure 9 is a sectional view on the line 9—9, Figure 7;

Figure 10 is a detail perspective view of a pipe tongs employing a gripping shoe constructed in accordance with the invention;

Figures 11 and 12 are detail elevational views of the gripping shoe shown in Figure 10.

The drawings show three typical applications of the pipe gripping device, Figure 1 disclosing the invention as embodied in a tubing hanger and also in a tubing catcher, and Figure 10 disclosing it as embodied in a pipe wrench. At the upper portion of Figure 1 is shown a casing head 1 mounted upon the well casing 2 and supporting an interiorly coned liner 3, these parts being of well known form. Within the liner 3 are a plurality of pipe gripping devices 4 which are formed as arcuate segmental slips whose external faces are coned to conform to the liner 3 and whose internal faces are provided with teeth or wickers which are adapted to engage or bite into the tubing 5 so as to support the latter. In the tubing hanger shown, the conical liner is held in assembled position on the casing head 1 by means of the usual set screws 6 while a packing nut or follower 7 which encircles the tubing and has threaded engagement with the liner 3 serves to compress the packing ring 8 which rests upon an interior shoulder of the liner and overlies the slips. As shown, the teeth or wickers 9 of the pipe gripping members or slips 4 face upwardly and normally rest in contact with the periphery of the tubing 5, so that the tubing is protected against accidental dropping while in the well or when being manipulated to pull it from the well.

The tubing catcher shown in Figure 1, in which pipe gripping members embodying the invention are incorporated, is of the well known form embodying a head 10 rigidly secured to the tubing 5 and through which the latter extends, the head being formed with downwardly tapering portions 11 for cooperating with the correspondingly tapered inner faces 12 of the slips or pipe gripping members 13 which latter are provided with external downwardly facing teeth or wickers 14 adapted to engage and bite into the inner circumference of the casing 2. As is usual, the pipe gripping slips 13 are freely slidable up and down on dovetails on the head 10, while upwardly facing shoulders 15 at the bottom of the head prevent the slips from moving downwardly to an extent permitting them to leave said head. Below the head 10 and encircling and freely slidable on the tubing 5 is a controlling collar 16 movably connected to the pipe gripping members 13 by links 17 which are respectively pivoted to the members 13 and to the controlling collar. Below the collar 16 is a striker weight 18 which loosely encircles the tubing 5 and rests upon a spring 19 which in turn rests upon a collar 20 firmly secured to the tubing. When the tubing 5 suddenly drops, the force of gravity tends to cause all parts of the catcher and the tubing to move downwardly at equal acceleration but the expansion of the spring 19 acts to retard the acceleration of the striker weight 18 so as to cause the latter to impact against the controlling collar 16, thus driving the latter and the pipe gripping slips 13 upward with relation to the head 10. This upward movement of the slips 13 with respect to the head 10 causes the slips to be forced outward radially of the catcher so as to bring their teeth or wickers 14 into contact with the inner surface of the well casing 2, thereby arresting downward movement of the tubing catcher and tubing.

Another application of the invention is illustrated in Figure 10 wherein a pipe gripping member 21 constructed in accordance with the invention is embodied in a pipe wrench of the multiple jaw type.

Each of the pipe gripping members or slips 4 employed in the tubing hanger tapers downwardly and is of arcuate form, its external surface 22 being preferably conical and its interior surface being generally cylindrical. Its internal surface is fashioned with a plurality of upwardly facing teeth 9, each tooth being of diamond form and having intersecting front or buttress faces 23 and a land or back face 24 which is inclined to said front faces at an acute angle. The front faces of each tooth converge at an obtuse angle and respectively diminish in height from their line of intersection until they preferably vanish entirely in the lands or back faces of respectively adjacent teeth, as well shown in Figures 5 and 6. By this means each of the teeth or wickers 9 is formed with a sharp point which enables it to firmly engage the pipe or tubing 5 immediately, after which the convergent front faces 23 of each tooth cut into the tubing 5 in a direction oblique to the axis of the tubing and that of the pipe gripping member 4. The oblique direction in which the faces 23 of the teeth cut into the tubing permits the gripping members 4 to promptly take better hold of the tubing more effectively than would be the case if the teeth cut into the tubing squarely transverse of its axis. As the convergent front faces 23 of the teeth diminish in height from their line of intersection the teeth do not cut into the entire circumference of the pipe to a uniform depth and consequently the strength of the pipe is not greatly diminished. The preservation of the strength of the pipe is also enhanced by arranging the teeth or wickers 9 in a plurality of series or rows, the teeth of one row respectively projecting between adjacent teeth of adjoining rows.

Figures 7, 8 and 9 show a pipe gripping member embodying the invention in the form of a slip 13 having downwardly facing external teeth 14 for gripping the interior surface of a well casing 2, the member 13 being specially designed for a tubing catcher of the well known type illustrated in Figure 1. While they face downwardly instead of upwardly, the teeth or wickers 14 of the pipe gripping member 13 are otherwise similar in form and arrangement to the teeth 9 with which the pipe gripping member 4 is provided; that is to say, each tooth or wicker 14 has buttress or front faces 23 which intersect at an obtuse angle and which diminish in height from their line of intersection, and each tooth also has a land or back face 24 which is inclined to said front faces at an acute angle. As in the case of the pipe gripping member 4, the toothed surface of the segmental member 13 is of general cylindrical form.

The segmental arcuate pipe gripping member 21, shown in Figure 10, is of a form suitable for use in pipe tongs or wrenches of the type embodying multiple jaws, being for that purpose provided with a lug 25 whereby it may be pivoted to the upper end of the handle 26 of the wrench by means of a pin 27. The gripping member 21 is provided on its inner surface with teeth 28 which are like the teeth or wickers 9 and 14 heretofore described but are so arranged that their points are adapted to resist rotation of the pipe with respect to the member 21.

The wickers or teeth, whether internal or external, are preferably formed on the slips by the crossing of spiral cuts which preferably are of uniform pitch, said cuts being made by the use of a screw threading lathe and each thread or cut being of a buttress form of section. The crossing of the spiral cuts to form the diamond shaped teeth is accomplished by cutting one set of threads right-hand and another set of threads left-hand, both buttress threads facing in the same direction. The angle of the spiral cuts is, of course, determined by the thread-cutting gears on the machine tool. While this is a convenient method of forming the teeth or wickers, it is not the intention to limit this invention to any specific mode of forming the teeth.

I claim:

1. A pipe gripping member having an arcuate surface provided with a plurality of teeth, each tooth having intersecting front faces which diminish in height from their line of intersection and being such as would be defined by intersecting spiral buttress thread faces and lands.

2. A pipe gripping member having an arcuate surface provided with a plurality of teeth, each tooth having convergent front faces and a back face which is inclined to said front faces at an acute angle and being such as would be defined by intersecting spiral buttress thread faces and lands.

3. A pipe gripping member having an arcuate surface provided with a plurality of teeth, each tooth having front faces which converge at an obtuse angle and increase in height as they converge and being such as would be defined by intersecting spiral buttress thread faces and lands.

4. A pipe gripping member having an arcuate surface provided with a plurality of teeth, each tooth having convergent front faces substantially normal to said arcuate surface and having a back face forming a land which intersects said front faces at an acute angle, said front faces increasing in height as they converge.

5. A pipe gripping member having an arcuate surface provided with a plurality of teeth, each tooth having convergent front faces substantially normal to said arcuate surface and diminishing in height laterally toward said surface and being such as would be substantially defined by intersecting spiral buttress thread faces and lands.

6. A pipe gripping member having an arcuate surface provided with a plurality of teeth arranged in substantially parallel rows, each tooth having tapered convergent front faces and a back face forming a land inclined to and intersecting said front faces at an acute angle, and the teeth of one row projecting between the teeth of the adjacent row.

7. A pipe gripping member having an arcuate surface provided with a plurality of diamond shape teeth arranged in substantially parallel rows, each tooth having tapered convergent front faces which increase in height as they converge and being such as would be defined by intersecting spiral buttress thread faces and lands, and the teeth of one row being spaced axially of said surface with respect to the teeth of the adjacent row.

In testimony whereof I affix my signature.

ALFRED G. HEGGEM.